ated May 5, 1964

3,132,129
AZO PHTHALOCYANINE DYESTUFFS
Heinz Adolf Dortmann, Bergisch Gladbach, and Peter Schmitz, Cologne-Stammheim, Germany, assignors to Farbenfabriken Bayer Aktiengesellschaft, Leverkusen, Germany, a corporation of Germany
No Drawing. Filed Mar. 18, 1960, Ser. No. 16,102
Claims priority, application Germany Mar. 21, 1959
3 Claims. (Cl. 260—147)

The present invention relates to new valuable dyestuffs; more particularly it relates to azo phthalocyanine dyestuffs of the formula $$Pc[R_6-R_7-N=N-R_8(R'_6-R)_m]_n \quad (I)$$

In this formula Pc means the residue of a phthalocyanine ring system, $R_6$ and $R'_6$ stand for $-SO_2-$ and/or $-CO-$ groups, $R_7$ denotes an amino group-containing residue of the benzene, naphthalene, pyrazolone or acylacetic acid amide series which is bound to $R_6$ via the amino group, $R_8$ represents the residue of a diazo compound, R means one of the groupings $$-CH_2-CH_2-OSO_3H$$
$$-CH_2-CH_2-OSO_3X, \quad -NH-R_1-OSO_3H$$
$$-NH-R_1-OSO_3X, \quad -NH-R_2\text{-halogen}$$

or $$-\left(\underset{Z}{\overset{N}{\bigcap}}\right)_q -R_3-R_4-R_5-W$$

X being an alkali metal cation, $R_1$ and $R_2$ stand for bridge members containing 2 or 3 carbon atoms between $-N-$ and $-O-$ or "halogen," halogen means Cl or Br, $R_3$ represents a lower alkylene or cycloalkylene radical, $R_5$ means an alkylene radicals having 2 to 3 carbon atoms between the residues $R_4$ and W, $R_4$ stands for $-O-$ or $-S-$ or the grouping $$-\underset{Y}{\overset{}{N}}-$$

Y and Z mean hydrogen or an araliphatic, cycloaliphatic or aliphatic substituent which may be a constituent of a heterocyclic ring, W stands for a substituent being capable of split off as a negative ion, $q$ stands for one of the numbers 0 or 1, $n$ stands for the numbers 1 to 8 and $m$ stands for a whole number, whereby the grouping ($R'_6-R$) may also stand for a heterocyclic radical which contains at least one group $$-N=\underset{}{\overset{}{C}}-Cl$$

bound to the radical $R_8$ by any bridge member.

It is an object of the invention to provide new dyestuffs which belong to the class of the so-called reactive dyestuffs, i.e. dyestuffs which are capable to react with $-OH$ or amide groups of fibrous material. Another object is the provision of a process for the dyeing and printing of cellulose-containing fibrous material with the novel dyestuffs of the invention, thus obtaining dyeings and prints which distinguish themselves by outstanding wet fastness properties and good to very good other fastness properties. Further objects will become apparent from the following disclosure.

The novel dyestuffs are obtained by coupling diazo compounds containing in the molecule at least one grouping $$-R'_6-R$$

with phthalocyanine acid amides having the following composition:

$$Pc-(R_6-R_7)_n$$

which are capable of being coupled in the radical $R_7$.
In the general formulae Pc, R, $R_6$, $R'_6$, $R_7$ and $n$ have the above significance.

The novel dyestuffs wherein the radical of the diazo component carries at least one grouping $$-N=\underset{}{\overset{}{C}}-Cl$$

correspond to the general formula $$Pc[R_6-R_7-N=N-R_8-(R_9-X)_m]_n$$

wherein Pc, $R_6$, $R_7$, $R_8$, $m$ and $n$ have the above said meaning and $R_9$ is any bridge member and X a heterocyclic radical containing at least one group $$-N=\underset{}{\overset{}{C}}-Cl$$

In the Formula I the radicals $R_1$ and $R_2$ may be straight chain as well as branched alkylene residues with 2 or 3 carbon atoms between $-N-$ and $-O-$ or "halogen." The bridge members may also contain hetero atoms, for instance in the case of an acyl group. Examples of residues wherein $R_2$ represents an acyl group are the $\beta$-chloro- or -bromoacetylamino or $\gamma$-chloro- or -bromopropionylamino group. Examples of the groupings $$-\left(\underset{Z}{\overset{N}{\bigcap}}\right)_q -R_3-R_4-R_5-W$$

are, inter alia, $$-NH-CH_2-CH_2-CH_2-\underset{CH_3}{\overset{}{N}}-CH_2-CH_2-OSO_3Na$$

$$-CH_2-\underset{alkyl}{\overset{}{N}}-CH_2-CH_2-OSO_3Na$$

$$-NH-CH_2-\underset{alkyl}{\overset{}{N}}-CH_2-CH_2-OSO_3Na$$

$$-\underset{(alkyl, aralkyl, aryl)}{\overset{}{N}}-CH_2-CH_2-\underset{alkyl}{\overset{}{N}}-CH_2-CH_2-OSO_3Na$$

$$-\underset{H}{\overset{}{N}}-CH_2-CH_2-\underset{alkyl}{\overset{}{N}}-CH_2-CH_2-CH_2-OSO_3Na$$

The grouping $$-N\underset{CH_2-CH_2}{\overset{CH_2-CH_2}{\diagup\diagdown}}N-CH_2-CH_2-OSO_3Na$$

may be mentioned as an example of the residue in which the substituent Y or Z in the groupings $$-\underset{Y}{\overset{}{N}}- \quad \text{or} \quad -\underset{Z}{\overset{}{N}}-$$

represents an aliphatic substituent which is a constituent of a heterocyclic ring. The group

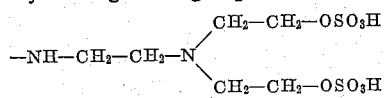

represents an example of a grouping wherein Y is the aliphatic substituent in the residue

(the definition of $R_4$) identical with $R_5$—W. The alkylene residue $R_5$ may be straight chain as well as branched. Under the term substituent capable of being split off as a negative ion there may be understood, for example, ester groupings such as $OSO_3X$ or

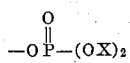

(X being hydrogen or an alkali metal cation), sulfonyloxy groups and halogen substituents such as Cl or Br.

Heterocyclic radicals containing the grouping

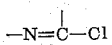

which may be linked to the radical of the diazo component, for instance via primary or secondary amino groups, or via sulfonamide or carbonamide groups or via hydroxy groups, are for instance dichloro- and monochloro-triazine radicals as well as dichloro- and monochloro-pyrimidine radicals.

Phthalocyanine acid amides of the type as defined and which are capable of being coupled in the radical $R_7$ can be obtained according to the process described in Belgian patent specification 551,700 by reaction between phthalocyanine sulfonic acid or carboxylic acid chlorides and primary or secondary amines from the benzene, naphthalene, pyrazolone, or acylacetic acid amide series which are capable of coupling. During this process, use may be made of metal-free as well as metal-containing phthalocyanines, for example those containing copper, cobalt, nickel, iron, chromium, aluminum, or zinc.

The acid chloride groups may be located in the benzene nuclei of the macrocyclic ring or also in annellated rings or in aryl residues, which are either linked directly to the phthalocyanine residues or via bridge atoms, such as —CO—, —$SO_2$—, or —NH—. The number of the formed sulfonic acid amide groups varies between 1 and 8, in accordance with the number of the sulfonic acid or carboxylic acid chloride groups present in the phthalocyanine residue. In addition, the phthalocyanine residue may also exhibit other substituents, such as halogen, alkyl, alkoxy, or acylamino groups.

As amines which are reacted with the phthalocyanine sulfonic acid or carboxylic acid chlorides for the preparation of phthalocyanine acid amides, primary and secondary aromatic amines from the benzene, naphthalene, pyrazolone, and acylacetic acid amide series which possess in the molecule at least one coupling position may be employed, for example aminonaphthols, aminonaphthol carboxylic acid amides, aminoarylpyrazolones, aminoaroylacetic acid amides, and acylacetic acid aminoarylamides.

Examples of suitable diazo components for the preparation of the novel dyestuffs are aminobenzenes, aminonaphthalenes, aminodiphenylene- and aminostilbene compounds, and heterocyclic amines which contain the grouping —$R'_6$—R at least once within the molecule, wherein $R'_6$ and R represent one of the groups as defined above.

The diazo components may also contain other substituents, such as halogen, nitro, hydroxy, alkyl, alkoxy, azo, acylamino, sulfonic acid, carboxylic acid, sulfonamide, N-substituted sulfonamide, carboxylic acid amide, or N-substituted carboxylic acid amide groups.

The introduction into the diazo components of the groupings —$R'_6$—R having the definition as given above can be carried out by various known processes via the corresponding sulfonic acid groups. Thus, sulfonic acid groups for conversion into the grouping

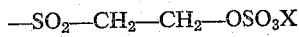

are reduced to the sulfinic acids or their sodium salts, these are subjected to reaction with β-chlorethyl alcohol or ethylene oxide, and the hydroxy groups are subsequently esterified with sulfuric acid, whereby the acid esters of sulfuric acid or their metal salts are formed. To convert them into the groupings

or

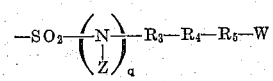

in the case where W represents an —$OSO_3X$ group the sulphonic acid groups in the diazo components containing sulphonic acid groups are transformed into the corresponding sulphochlorides by treatment with thionyl chloride and chlorsulphonic acid, and these are condensed, preferably in a weakly alkaline medium, with, e.g., semiesters of sulphuric acid with alkalolamines, such as ethanolamine, N-methyl - N - hydroxyethylpropylenediamine-(1,3), or N,N - dihydroxyethylpropylenediamine-(1,3). It is also possible to proceed by transforming the sulphonic acid group into the sulphochloride group, to react these first with alkalolamines, and eventually to esterify the hydroxyalkylsulphonamides thus obtained with sulphuric acid or monohydrate. In the same manner, the groupings

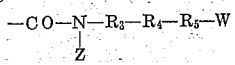

can be built up from the carboxylic acids on which they are based.

Where it is desired to introduce groupings wherein W stands for a halogen atom, the corresponding ω-haloalkylamines are employed instead of the alkanolamines for reaction with the sulphochloride or carboxylic acid chloride groups.

Coupling of the diazonium compounds with the phthalocyanine acid amides is carried out by the usual procedure, generally in aqueous solution, or in suspension. The dyestuffs thus obtainable impart various dye shades, according to the type of the employed azo components. The clear bluish to yellowish green dyestuffs which are obtained with azo components from the pyrazolone or acylacetic acid arylamide series are of particular value.

A modified method of carrying out the process for the preparation of the novel dyestuffs consists in first combining the diazo compounds containing sulphonic acid or carboxylic acid groups with the phthalocyanine acid amides capable of coupling of the given composition, and to transform the sulphonic acid groups into groupings of the formula —$R'_6$—R only after the dyestuffs have thus been obtained. In a similar manner, the reaction products of diazo compounds containing sulphochloride or carboxylic acid chloride groups with alkanolamines, for example ethanolamines, may be coupled with the phthalocyanine acid amides, and the hydroxy groups in the dyestuffs containing the hydroxyalkylsulphonamide or -carboxylamide groups can subsequently be esterified.

According to a further modification, the novel dyestuffs are also obtainable by introducing the grouping —$SO_2R$— only into the dyestuff molecule after the diazo compounds have been coupled with the phthalocyanine acid amides. For this purpose, the dyestuff is subjected to sulphochlorination, preferably with chlorsulphonic acid and thionyl chloride, whereby sulphochloride groups can also be introduced into the phthalocyanine molecule and into the residue $R_7$. The sulphochloride groups can then be transformed into sulphonic or into sulphonamide groups having the desired constitution, for example according to one of the aforementioned procedures.

When the phthalocyanine acid amides per se also contain sulphonic acid, carboxylic acid, or sulphonic acid chloride or carboxylic acid chloride groups, these may also be transformed into groupings of the formula —R'$_6$—R in the final dyestuffs, in the case where it is desired to prepare end products free from acid groups. This is of advantage in many cases, since the dyestuffs free from acid groups yield dyeings having particularly favourable wet-fastness properties.

The introduction into the dyestuff components of the heterocyclic groupings X having the definition as given above can be carried out by various processes which are known per se. For instance amino group-containing or amide group-containing diazo components of the benzene, naphthalene or heterocyclic series can be condensed with 2,4,6-trichloro-1,3,5-triazine or 2,4,6-trichloro-1,3-pyrimidine to give the corresponding compounds containing triazinyl-amino or pyrimidinyl-amino groups. Instead of the trichloro-triazine and trichloro-pyrimidine respectively there may also be used the analogous compounds having only two free halogen atoms wherein the third halogen atom is exchanged against any nitrogen-containing or oxygen-containing radical such as one alkyl or arylamino radical with or without dyestuff character, or an alkyloxy or aryloxy radical. The aforesaid exchange can, of course, be accomplished also at other stages of the process for instance in the reaction product from the diazo component and the heterocyclic compound or in the final phthylocyanine dyestuff.

The coupling of the diazonium compounds with the phthalocyanine acid amines is carried out in usual manner.

The dyestuffs thus obtained show different shades depending on the nature of the azo component used. The clear bluish green and yellowish green dyestuffs which are obtainable with the other components of the pyrazolone or acylacetic acid arylamide series are especially valuable.

A modified method of carrying out the process for the preparation of the novel dyestuffs according to the invention consists in first combining any diazo compounds containing no heterocyclic radical with at least one

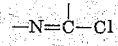

group, with the phthalocyanine acid amides capable of coupling and subsequently introducing into the radical of the diazo component of the dyestuffs thus obtained the heterocyclic radical with at least one

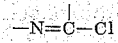

group.

According to another embodiment of the invention the novel dyestuffs can be obtained by condensing the acid chlorides used in the preparation of the phthalocyanine acid amides of the Formula I with aminoazo compounds from any diazo components and amino group-containing coupling components of the benzene, naphthalene, prazolone or acylacetic acid amide series and, in case diazo components having no heterocyclic radical with the group

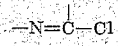

are used, subsequently introducing such a radical into the radical of the diazo component.

The phthalocyanine acid amides capable of coupling may contain sulfonic acid, carboxylic acid or, via any bridge members such as amino and amide groups, heterocyclic radicals with at least one

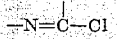

group, in addition to other substituents such as phenyl and halogen.

The novel dyestuffs are suitable for dyeing and printing of materials containing hydroxyl groups or amide groups, in particular for dyeing and printing fibres and fabrics from natural and regenerated cellulose. On these materials, dyeings or prints with outstanding fastness towards washing and boiling are obtained when the dyes are applied to the dyeing material and the dyeing goods are subjected to the action of acid-binding agents, preferably at elevated temperatures.

For dyeing, the dyestuffs are preferably employed in the form of an aqueous solution which can be treated with substances having an alkaline reaction, such as alkali hydroxide or alkali carbonate, or with compounds changing into substances with alkaline reaction, such as sodium bicarbonate. Further auxiliaries may be added to the solution, but these must not react with the dyestuffs in an undesirable manner. Additives of this type are, for example, surface active substances such as alkyl sulphates, or compounds preventing the migration of the dyestuff, or dyeing assistants such as urea (to improve the solubility and fixation of the dyestuffs), or inert thickeners such as oil-in-water emulsions, tragacanth, starch, alginate, or methyl cellulose.

The solutions or pastes thus perepared are applied to the material to be dyed, for instance by padding on the foulard or by printing, and by subsequently heating to an elevated temperature, preferably between 40–160° C. for some time. Heating may be carried out in the hotflue, steaming apparatus, or heated rollers, or by introduction into hot concentrated salt baths, either as a single treatment or consecutively in any desired sequence.

When a padding or dyeing liquor is used without alkali, a passage of the dry material through a solution having an alkaline reaction, to which common salt or Glauber salt is added, is arranged to follow. The addition of salt during this process reduces the migration of dyestuff from the fibre.

After fixing has been completed, the dyeing goods are rinsed hot, and where the further use of the dyed material so requires, eventually soaped, so that residues of dyestuff which had not been sufficiently fixed can be removed. Dyeings of excellent fastness to wet processing are obtained.

For printing of materials containing hydroxyl groups, use is made of a printing paste consisting of the dyestuff solution, a thickener such as sodium alginate, and a compound having an alkaline reaction or splitting off alkali on heating, such as sodium carbonate, potassium carbonate, or sodium bicarbonate, and the printed material is rinsed and eventually soaped, where necessary.

Materials containing amide groups, such as wool, silk, synthetic polyamides or polurethanes and the like can also be dyed or printed. The dyeing process is preferably followed by a washing in aqueous liquor.

The following examples are given for the purpose of illustrating the invention:

*Example 1*

78.8 parts by weight (0.05 mol) of the compound capable of coupling prepared by known methods from 1 mol of nickel-phthalocyanine-(3)-tetrasulphochloride and 4 mols of 1-(4'-aminophenyl)-3-methyl-5-pyrazolone are introduced into a solution of 106 parts by weight of soda in 2 litres of water and stirred until a clear solution has been obtained. A diazotised solution of 0.2 mol of 1-aminobenzene - 3 - (sulphonylamino - β - hydroxyethylsulphuric acid ester) is run into it at 0–5° C. whilst stirring well. After coupling is completed, the dyestuff is entirely salted out by addition of common salt, filtered off by suction, and dried.

0.3 part by weight of the dry dyestuff are stirred into 10 ml. of a solution containing per litre 100 parts by weight of urea, 25 ml. of concentrated NaOH, and 3 ml. of Turkey red oil. This solution is padded on a cotton fabric, and this is dried at 120° C. for 10 minutes in a drying oven. After boiling and soaping, a clear neutral green dyeing is obtained, having an excellent resistance to wet processing and good fastness to light.

If the diazo components listed in the following table are employed in place of the 1-aminobenzene-3-(sulphonylamino-β-hydroxyethyl-sulphuric acid ester), valuable dyestuffs are also obtained, and these, when fixed according to the described or modified procedure in presence of an acid-binding agent, yield on cotton the shades mentioned below:

| Diazo component | Shade on cotton |
|---|---|
| 1-Aminobenzene-2-(sulphonylamino-β-hydroxyethyl-sulphuric acid ester). | Neutral green. |
| 1-Aminobenzene-2-methoxy-5-(sulphonylamino-β-hydroxyethyl-sulphuric aced ester). | Yellowish green. |
| 1-Aminobenzene-2-methyl-4-(sulphonylamino-β-hydroxyethyl-sulphuric acid ester). | Do. |
| 1-Aminobenzene-4-methyl-3-(sulphonylamino-β-hydroxyethyl-sulphuric acid ester). | Somewhat yellowish green. |
| 1-Aminobenzene-3-nitro-4-(sulphonylamino-β-hydroxyethyl-sulphuric acid ester). | Somewhat olive tinted green. |
| 1-Aminobenzene-2-chloro-4-(sulphonylamino-β-hydroxyethyl sulphuric acid ester). | Yellowish green. |
| 1-Aminobenzene-2-carboxylic acid-5-(sulphonylamino-β-hydroxyethyl-sulphuric acid ester). | Neutral green. |
| Aforesaid dyestuff treated with copper | Somewhat yellowish green. |
| 1-Aminobenzene-2-methyl-4-chloro-6-(sulphonylamino-β-hydroxyethyl sulphuric acid ester). | Bluish green. |
| 1-Aminobenzene-2,5-dichloro-4-(sulphonylamino-β-hydroxyethyl sulphuric acid ester). | Neutral green. |
| 1-Aminobenzene-2,4-dimethyl-6-(sulphonylamino-β-hydroxyethyl sulphuric acid ester). | Somewhat bluish green. |
| 1-Aminobenzene-3,4-dichloro-6-(sulphonylamino-β-hydroxyethyl-sulphuric acid ester). | Neutral green. |

*Example 2*

195 parts by weight of 2-hydroxynaphthalene-3-carboxylic acid-(3'-aminophenyl)-amide are stirred into 250 parts by weight of dimethylformamide and 125 parts by weight of methanol, and 87 parts by weight of copperphthalocyanine-(3)-trisulphonic acid chloride are added at 20–25° C. Stirring is subsequently continued at room temperature for 30–40 hours, the melt is added to 750 parts by weight of methanol, the mixture is filtered off by suction and washed with methanol. For purification the reaction product is stirred up at 60–70° C. with about 1.5 litres of dilute HCl, filtered off by suction, washed until neutral, and dried. The reaction product which is readily soluble in a sodium hydroxide solution is obtained in good yield.

0.05 mol of the phthalocyanine acid amide which is thus prepared and which is capable of coupling is coupled with 0.15 mol of diazotised 1-aminobenzene-3-(sulphonyl-β-hydroxyethyl-sulphuric acid ester) in a soda alkaline solution. After coupling is completed, the pH of the solution is adjusted to 9, and the dyestuff is entirely salted out by addition of some potassium chloride. The dyestuff thus obtained dyes cotton in brownish grey shades according to the process detailed in Example 1.

When 0.05 mol of the phthalocyanine sulphonic acid amide are coupled with 0.15 mol of diazotised 1-aminobenzene - 2 - methoxy-4-(sulphonylamino-β-hydroxyethyl-sulphuric acid ester), the dyestuff thus obtained dyes cotton in dull violet shades.

*Example 3*

0.05 mol of a compound capable of coupling and prepared from 130 parts by weight of 1-amino-7-hydroxynaphthalene and 87 parts by weight of copper-phthalocyanine-(3)-trisulphonic acid chloride in dimethylformamide/methanol are coupled with 0.15 mol of diazotised 1 - aminobenzene - 3 - (sulphonylamino-β-hydroxyethylsulphuric acid ester). The dyestuff thus obtained dyes cotton in green-blue shades according to the process described in Example 1.

When 0.05 mol of the phthalocyanine-sulphonic acid amide are coupled with 0.15 mol of the diazotised 1-aminobenzene - 2 - methoxy - 4 - (sulphonylamino - β-hydroxyethyl-sulphuric acid ester), the dyestuff thus obtained dyes cotton in blue-grey shades.

*Example 4*

(a) 0.1 mol of the dyestuff from 4 mols of diazotised 1-aminobenzene-3-sulphonic acid and 1 mol of phthalocyanine-sulphonic acid amide, capable of coupling and prepared from 1 mol of nickel-phthalocyanine-(3)-tetrasulphonic acid chloride and 4 mols of 1-(4'-aminophenyl)-3-methyl-5-pyrazolone, is introduced into 500 ml. of chlorsulphonic acid whilst cooling with ice. The mixture is heated to 35–40° C. for 1 hour, 150 ml. of thionyl chloride are then added dropwise, and stirring is continued for 4 hours. After cooling, the melt is added to ice, the well crystalline green sulphochloride of the dyestuff is filtered off by suction, and washed with ice water until neutral to Congo red.

(b) 0.02 mol of the moist dyestuff sulphochloride prepared according to (a) are introduced whilst cooling with ice into an alkaline solution (pH value 9.5–10) of 28 parts by weight of β-aminoethyl alcohol-sulphuric acid semiester in 200 ml. of water. Cooling is then removed, and the temperature is allowed to rise gradually to 20–25° C. During this process, the water-insoluble sulphochloride goes into solution with a green colour. The pH value is kept constant by addition of dilute NaOH. After condensation is completed, the dyestuff is salted out with KCl, filtered off by suction, and dried at 50° C. in vacuo.

The dyestuff thus prepared can be applied to cotton or staple fibre by the usual method from aqueous alkaline solutions or by means of a suitable printing paste. Green dyeings or prints are obtained, having good fastness to washing, light and solvents.

(c) The dyestuff obtainable according to procedure (b) may also be prepared by first condensing the sulphochloride with an aqueous solution of β-aminoethyl alcohol, and esterifying the sulphonic acid-hydroxyethylamide with sulphuric acid or chlorsulphonic acid according to usual methods.

*Example 5*

0.02 mol of a dyestuff sulphochloride prepared according to Example 4a are introduced whilst cooling with ice into an alkaline aqueous solution (pH value 9.5–10) of 0.2 mol of 1-aminobenzene-3-sulphonic acid hydroxyethylamide-sulphuric acid semiester. Condensation and working up of the dyestuff is caried out according to the instructions of Example 4b.

It is also possible to proceed by first reacting the dyestuff sulphochloride with 1-aminobenzene-3-sulphonic acid-hydroxyethyl amide according to Example 4c and by esterifying the isolated dry condensation product with sulphuric acid or chlorosulphonic acid/pyridine according to usual methods.

*Example 6*

0.02 mol of a dyestuff sulphochloride prepared according to Example 4a are introduced at 0–5° C. into a solution of 27 parts by weight of N-methyl-N-hydroxyethylpropylenediamine-(1,3) in 300 ml. of water. The temperature is allowed to rise gradually to 20–25° C., stirring is continued for 2 hours, and finally heating is carried out at 60° C. for 2–3 hours. The reaction product is then filtered off by suction whilst hot, the residue is washed out with water, and dried at 60° C. in vacuo.

The green condensation product thus obtained is dissolved in three times its amount by volume of sulphuric acid monohydrate (5.5 times its amount by weight) at 15–20° C., and is added to ice after stirring for 3–4 hours, and filtered. For removal of mineral acid, it is washed with ice water, the residue is adjusted to pH 6 with dilute NaOH, and dried at 50° C. in vacuo.

The dyestuff can be applied to cotton or regenerated cellulose in the usual manner by means of alkalis, fixed by means of heat treatment, and results in green dyeings or prints having good fastness properties to boiling, light, and solvents.

Example 7

0.02 mol of a dyestuff sulphochloride prepared according to Example 4a are treated with 32 parts by weight of N,N-dihydroxyethyl-propylenediamine-(1,3) in 350 ml. of water, as described in Example 6. The green condensation product is slightly soluble in water. After drying, it can be esterified with sulphuric acid monohydrate or with pyridine/chlorsulphonic acid. The dyestuff ester is insoluble at pH 7; it dissolves readily in soda alkalis with a green colour. To improve its filtering properties, some KCl is expediently added.

Example 8

0.055 mol of the dyestuff from 4 mols of diazotised 1-methyl-4-aminobenzene-2-sulphonic acid and 1 mol of the phthalocyanine-sulphonic acid amine, capable of coupling and prepared from 1 mol of nickel-phthalocyanine-(3)-tetrasulphonic acid chloride and 4 mols of 1-(4'-aminophenyl)-3-methyl-5-pyrazolone, are introduced into 200 ml. of chlorsulphonic acid whilst cooling with ice. After stirring for one hour at 30° C., the dyestuff had dissolved. 60 ml. of thionyl chloride are now added dropwise, stirring is continued at 30° C. for 3 hours, and the melt is added to ice. To remove mineral acids, it it rinsed with water until the filtrate running off no longer shows acid reaction. The moist sulphochloride is then introduced at 0–5° C. into a soda-alkaline solution of 56 parts by weight of β-aminoethyl alcohol-sulphuric acid semiester in 560 ml. of water at pH 9.5–10. The pH value is kept constant by addition of dilute sodium hydroxide solution. The green condensation product thus obtained is insoluble in water, but readily dissolves in dilute alkalis with a green colour. The dyestuff ester can be applied and fixed on cotton and viscose rayon by the methods described above.

Example 9

0.1 mol of dyestuff from 4 mols of diazotised aniline and 1 mol of phthalocyanine-sulphonic acid amide, capable of coupling and prepared from 1 mol of nickel-phthalocyanine-(3)-tetrasulphonic acid chloride and 4 mols of 1-(4' or 3'-aminophenyl)-3-methyl-5-pyrazolone, is introduced with cooling at 15–20° C. into 400 ml. of chlorsulphonic acid. The temperature is raised to 40° C. and stirring is continued until no more hydrogen chloride escapes. 90 ml. of thionyl chloride are then added dropwise in accordance with its rate of consumption. After cessation of gas evolution, the melt is added to ice and washed until free from acid. The dyestuff sulphochloride thus obtained is insoluble in water. It can be condensed, according to the methods detailed in Examples 4–8, with ethanolamine, 1-aminobenzene-3-sulphonic acid-hydroxyethylamide-sulphuric acid semiester, 1-aminobenzene-3-sulphonic acid-hydroxyethylamide, N-methyl-N-hydroxyethylpropylenediamine-(1,3)-, N,N-dihydroxyethyl-propylenediamine-(1,3)-, or similar hydroxyalkylamines, and where required be transformed by subsequent esterification with sulphuric acid monohydrate or chlorsulphonic acid/pyridine, yielding dyestuffs which, with the aid of alkalis, can be applied to and fixed on fibres containing hydroxyl groups or amide groups. The dyeings or prints thus obtained have good fastness properties to boiling, light, and solvents.

Example 10

In accordance with the Examples 4–9, the dyestuffs by coupling 4 mols of diazotised 1-amino-2-methoxybenzene or 1-amino-2-methoxybenzene-4-sulphonic acid with 1 mol of phthalocyaninesulphonic acid amide, capable of coupling and prepared from 1 mol of nickel-phthalocyanine-(3)-tetrasulphonic acid chloride and 4 mols of 1-(4'-aminophenyl)-3-methyl-5-pyrazolone, can be transformed into sulphochlorides with chlorsulphonic acid/thionyl chloride, and converted to valuable dyestuffs with aminoalcohols or their sulphuric acid semiesters. The yellowish-green dyeings or prints obtained according to the above-described methods of fixation exhibit good general fastness properties.

Example 11

(a) 97 parts by weight (0.1 mol) of copper-phthalocyanine - (3) - tetrasulphonic acid chloride obtainable by known methods are condensed in aqueous solution (about 1.5 litres) and at room temperature with 0.1 mol of the monoazo dyestuff obtained by coupling diazotised 1-amino-2-methoxybenzene - 4 - sulphonic acid hydroxyethylamide-sulphuric acid semiester with 1-(4-aminophenyl)-3-methyl-5-pyrazolone, and with 0.3 mol of β-aminoethylalcohol-sulphuric acid semiester, whilst the pH value is kept constant at 9.5–9.8. After condensation is completed, the dyestuff is isolated by salting out, filtered off by suction, and dried. According to the above-described methods of fixation bluish-green dyeings or prints are obtained on materials containing hydroxyl groups.

(b) When the proportions of the reaction components in process (a) are modified as follows:

0.1 mol of copper-phthalocyanine - (3) - tetrasulphonic acid chloride, 0.2 mol of monoazodyestuff 1-amino - 2 - methoxybenzene-4-sulphonic acid - hydroxyethylamide - sulphuric acid semiester→1-(4'-aminophenyl) - 3 - methyl-5-pyrazolone, 0.2 mol of β-hydroxyethylamine-sulphuric acid semiester, the dyestuff thus obtained dyes materials containing hydroxyl groups in yellowish green shades.

(c) When the proportions of the reaction component in process (a) are modified as follows:

0.1 mol of copper-phthalocyanine - (3) - tetrasulphonic acid chloride, 0.3 mol of monoazodyestuff 1-amino - 2 - methoxybenzene - 4 - sulphonic acid-hydroxyethylamide-sulphuric acid semiester→ 1 - (4' - aminophenyl) - 3 - methyl - 5 - pyrazolone, 0.1 mol of β-hydroxyethylamine-sulphuric acid semiester, the dyestuff then obtained dyes materials containing hydroxyl groups in intense yellowish green shades.

Example 12

(a) 97 parts by weight (0.1 mol) of nickel-phthalocyanine-(3)-tetrasulphonic acid chloride are condensed in aqueous solution (about 1.5 litres) and at room temperature with 0.1 mol of the monoazo-dyestuff obtained by coupling diazotised 1-amino - 2 - chlorobenzene-4-sulphonic acid-hydroxyethylamide-sulphuric acid semiester with 1 - (3' - aminophenyl) - 3 - methyl - 5 - pyrazolone, and with 0.3 mol of β-aminoethyl alcohol-sulphuric acid semiester, whilst the pH value is kept constant at 9.5–9.8. When condensation is completed, the dyestuff is isolated by salting out, filtered off by suction, and dried. According to the known methods of fixation in the presence of alkali, green dyeings or prints are obtained on materials containing hydroxyl groups.

(b) When the proportions of the reaction components in process (a) are modified as follows:

0.1 mol of nickel - phthalocyanine - (3) - tetrasulphonic acid chloride, 0.2 mol of monoazo dyestuff 1-amino - 2 - chlorobenzene-4 - sulphonic acid - hydroxyethylamide - sulphuric acid semiester→1-(3'-aminophenyl) - 3 - methyl - 5 - pyrazolone, 0.2 mol of β-hydroxyethylamine-sulphuric acid semiester, the dyestuff then obtained dyes materials containing hydroxyl groups or amide groups in greed shades.

(c) When the proportions of the reaction components in process (a) are modified as follows:

0.1 mol of nickel-phthalocyanine - (3) - tetrasulphonic acid chloride, 0.3 mol of monoazodyestuff 1-amino - 2 - chlorobenzene-4 - sulphonic acid - hydroxyethylamide - sulphuric acid semiester→1-(3'-aminophenyl) - 3 - methyl - 5 - pyrazolone, 0.1 mol of β-hydroxyethylamide-sulphuric acid semiester, the dyestuff then obtained also dyes material containing hydroxyl groups and amide groups in green shades.

*Example 13*

(a) 97 parts by weight (0.1 mol) of copper-phthalocyanine - (3) - tetrasulphonic acid chloride are condensed in aqueous solution (about 1.5 litres) and at room temperature with 0.1 mol of the monoazo dyestuff obtained by coupling diazotised 1-amino-2-chlorobenzene - 4 - sulphonic acid-hydroxyethylamide-sulphuric acid semiester with 1-(3'-aminophenyl) - 3 - methyl - 5 - pyrazolone, and with 0.3 mol of β-hydroxyethylamino-sulphuric acid semiester whilst the pH value is kept constant at 9.5–9.8. After condensation is completed, the dyestuff is isolated by salting out, filtered off by suction, and dried. According to the above-described methods of fixation, green dyeings or prints are obtained on materials containing hydroxyl groups.

(b) When the proportions of the reaction components in process (a) are modified as follows:

0.1 mol of copper-phthalocyanine - (3) - tetrasulphonic acid chloride, 0.2 mol of monoazo dyestuff 1-amino - 2 - chlorobenzene- 4 - sulphonic acid - hydroxyethylamide - sulphuric acid semiester→1-(3'-aminophenyl) - 3 - methyl - 5 - pyrazolone, 0.2 mol of β-hydroxyethylamine-sulphuric acid semiester, the dyestuff then obtained dyes materials containing hydroxyl groups in green shades.

(c) When the proportions of the reaction components in process (a) are modified as follows:

0.1 mol of copper-phthalocyanine-(3)-tetrasulphonic acid chloride, 0.3 mol of monoazodyestuff 1-amino - 2 - chlorobenzene- 4 - sulphonic acid - hydroxyethylamide - sulphuric acid semiester→1-(3'-aminophenyl) - 3 - methyl - 5 -pyrazolone, 0.1 mol of β-hydroxyethylamine-sulphuric acid semiester, the dyestuff then obtained dyes materials containing hydroxyl groups in green shades.

*Example 14*

97 parts by weight (0.1 mol) of nickel-phthalocyanine- (3)-tetrasulphonic acid chloride are condensed in aqeuous solution (about 1.5 litres) and at room temperature with 0.1 mol of the monoazodyestuff obtained by coupling diazotised 1-amino-2-carboxybenzene - 4 - sulphonic acid-hydroxyethylamide-sulphuric acid semiester with 1-(4'-aminophenyl) - 3 - methyl - 5 -pyrazolone, and with 0.3 mol of β-hydroxyethylamine-sulphuric acid semiester, whilst the pH value is kept constant at 9.5–9.8. After condensation is completed, the dyestuff is isolated by salting out, filtered off by suction, and dried. According to the above-described methods of fixation, somewhat bluish green dyeings or prints are obtained on materials containing hydroxyl groups.

When the dyestuff is subjected to an ammonical coppering, isolation followed by the described methods of fixation produce green dyeings or prints on materials containing hydroxyl groups.

*Example 15*

78.7 parts by weight (0.05 mol) of the compound capable of coupling which is obtainable by known methods from 1 mol of nickel-phthalocyanine-(3)-tetrasulfochloride and 4 mols of 1-(4'-aminophenyl)-3-methyl-pyrazolone-5 are dissolved in 4 N NaOH and precipitated with dilute acetate acid in a fine state.

Into this suspension there is run in 0.2 mol of an aqueous solution, neutralised with sodium acetate, of the diazonium salt of the condensation product prepared by known methods from 1 mol of 2,4-diaminobenzene-sulfonic acid-1 and 1 mol of cyanuric chloride. After coupling is finished the dyestuff is salted out by addition of potassium chloride, filtered, washed neutral with potassium chloride solution and subsequently dried in vacuum at 25 to 30° C. The dyestuff dissolves in water and dyes cellulose-containing fibres at elevated temperature, for instance at 30 to 35° C. from preferably soda alkaline bath in clear green shades of excellent fastness to wet processing.

*Example 16*

78.7 parts by weight (0.05 mol) of the compound capable of coupling and prepared by known methods from 1 mol of nickel-phthalocyanine-(3)-tetrasulfochloride and 4 mols of 1-(4'-aminophenyl)-3-methyl-pyrazolone-5 are introduced in a solution of 106 parts by weight of soda in 2 l. of water and stirred until a clear solution has been formed. Into this solution there are run in at 0 to 5° C. a diazotised solution of 0.2 mol of a condensation product from 1 mol of 2,4-diaminobenzene-sulfonic acid-1 and 1 mol of 1-(4'-sulfophenylamino)-3,5-dichlorotriazine. After coupling is complete the dyestuff is precipitated by addition of sodium chloride, filtered, washed neutral and dried at room temperature. The dyestuff can be padded from an alkaline bath containing sodium chloride on cellulose materials and yields clear green shades with outstanding fastness to wet processing.

*Example 17*

78.7 parts by weight (0.05 mol) of the compound capable of coupling and prepared from 1 mol of nickel-phthalocyanine-(3)-tetrasulfochloride and 4 mols of 1-(4' - aminophenyl) - 3 - methyl - pyrazolone - 5 are dissolved soda alkaline in 2 to 3 l. of water and adjusted to a neutral or slightly acid pH value by adding acetic acid.

Into this solution there are added dropwise with good stirring at 0 to 5° C. a diazotised solution, neutralised by the addition of sodium acetate, of 0.1 mol of the 1-aminobenzene-3-β-hydroxyethylsulfone-sulfuric acid semiester prepared by known methods and at the same time a diazotised solution, neutralised by the addition of sodium acetate, of 0.1 mol of 1-aminobenzene-3,5-disulfonic acid. When the coupling is complete the dyestuff is isolated and dried in vacuum at a low temperature.

By fixing for instance on cotton in the presence of acid-binding agents by the herein described methods, clear green shades of outstanding fastness to wet processing are obtained.

*Example 18*

78.7 parts by weight (0.05 mol) of the compound capable of coupling and prepared from 1 mol of nickel-phthalocyanine-(3)-tetrasulfochloride and 4 mols of 1- (4' - aminophenyl) - 3 - methyl - pyrazolone - 5 are dissolved soda alkaline in 2 to 3 l. of water and adjusted to a neutral or slightly acid pH value by the addition of glacial acetic acid. Into this solution there is added dropwise with good stirring at 0 to 5° C. a diazotised solution, neutralised by the addition of sodium acetate, of 0.1 mol of 1-amino-2-methoxybenzene-4-β-hydroxyethylsulfone-sulfuric acid semiester prepared by known methods and at the same time a diazotised solution, neutralised by the addition of sodium acetate of 0.1 mol of 1-aminobenzene-3,5-disulfonic acid.

After the coupling is complete the dyestuff is isolated and dried in vacuum at a low temperature.

By fixing the dyestuff for instance on cotton in the presence of acid-binding agents by the herein described methods, clear yellowish green dyeings of outstanding fastness to wet processing are obtained.

Example 19

78.8 parts by weight (0.05 mol) of the compound capable of coupling and prepared from 1 mol of nickel-phthalocyanine-(3)-tetrasulfochloride and 4 mols of 1-(4' - aminophenyl) - 3 - methyl - pyrazolone - 5 are dissolved soda alkaline in 2 to 3 l. of water and adjusted to a neutral or slightly acid pH by addition of glacial acetic acid.

Into this solution there are added dropwise with good stirring at 0 to 5° C. a diazotised solution, neutralised by the addition of sodium acetate, of 0.1 mol of 1-aminobenzene-3,5-disulfonic acid-β-chloroethylamine prepared by known methods and at the same time a diazotised solution, neutralised by the addition of sodium acetate, of 0.1 mol of 1-aminobenzene-3,5-disulfonic acid.

After the coupling is complete the dyestuff is isolated and dried in vacuum at a low temperature.

By fixing the dyestuff for instance on cotton in the presence of acid-binding agents by herein described methods clear green dyeings of outstanding fastness to wet processing are obtained.

What is claimed is:

1. A dyestuff which in the free acid state corresponds to the formula $$Pc[SO_2-R_7-N=N-R_8-(SO_2-R)_m]_n$$

wherein Pc stands for a metal phthalocyanine moiety selected from the group consisting of copper phthalocyanine, nickel phthalocyanine, and cobalt phthalocyanine, $R_7$ means an amino group-containing radical selected from the group consisting of the naphthalene and pyrazolone series which is linked to the $SO_2$ group via the amino group, $R_8$ stands for the residue of a diazo component consisting of a radical of the benzene series, R means a member selected from the group consisting of $$-NH-(CH_2)_2-OSO_3H$$

and $$-NH-(CH_2)_3-N-(CH_2-CH_2-OSO_3H)_2$$

$m$ and $n$ stand for a whole number within the range of 1 to 4.

2. The phthalocyanine dyestuff corresponding to the formula

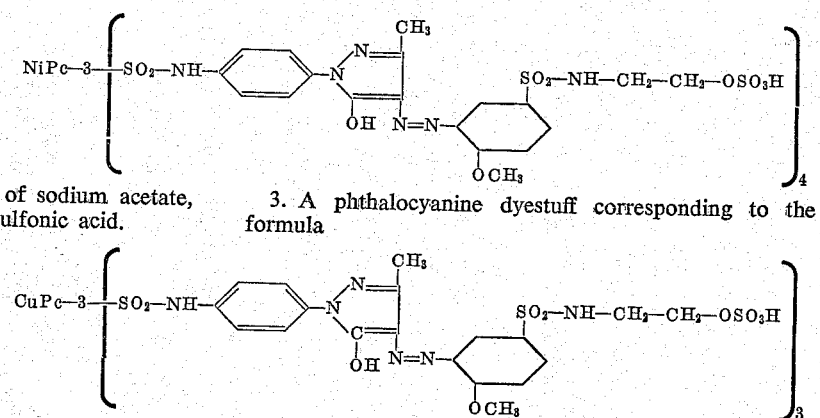

3. A phthalocyanine dyestuff corresponding to the formula

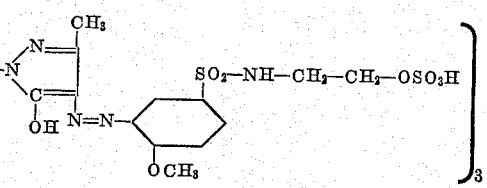

References Cited in the file of this patent

UNITED STATES PATENTS

| | | |
|---|---|---|
| 1,857,244 | Hentrich et al. | May 10, 1932 |
| 2,195,390 | Ellis et al. | Mar. 26, 1940 |
| 2,434,493 | Muller et al. | July 22, 1947 |
| 2,995,412 | Kleb | Aug. 8, 1961 |

FOREIGN PATENTS

| | | |
|---|---|---|
| 218,807 | Australia | Nov. 18, 1958 |

OTHER REFERENCES

Wegmann: "Textile Praxis," October 1958, pp. 1056–1061.